Feb. 8, 1949.  A. A. BUREAU  2,460,972
CABLE REEL WITH ADJUSTABLE DRUM PORT
Filed Nov. 8, 1946  2 Sheets-Sheet 1
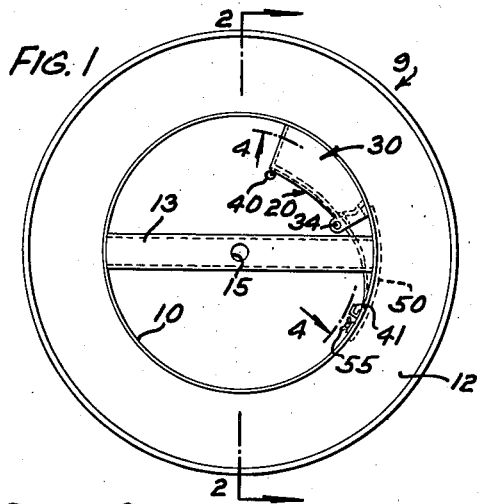
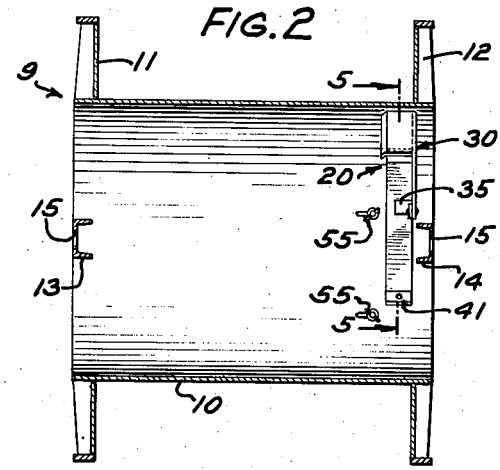
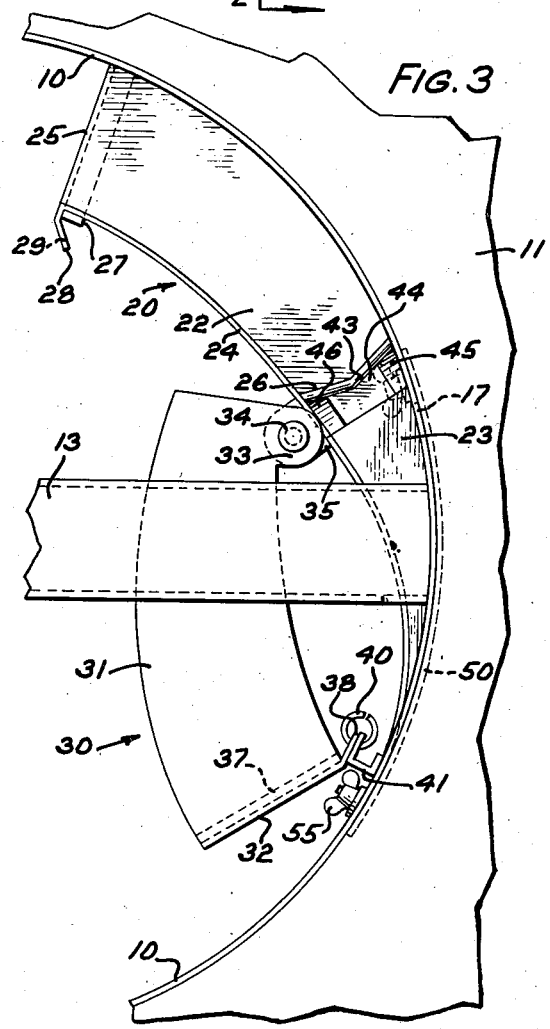
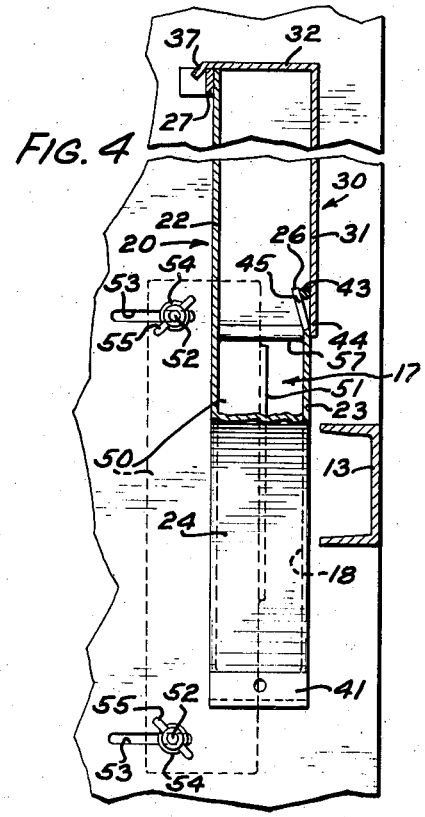
INVENTOR
A. A. BUREAU
BY
ATTORNEY Feb. 8, 1949. A. A. BUREAU 2,460,972
CABLE REEL WITH ADJUSTABLE DRUM PORT
Filed Nov. 8, 1946 2 Sheets-Sheet 2
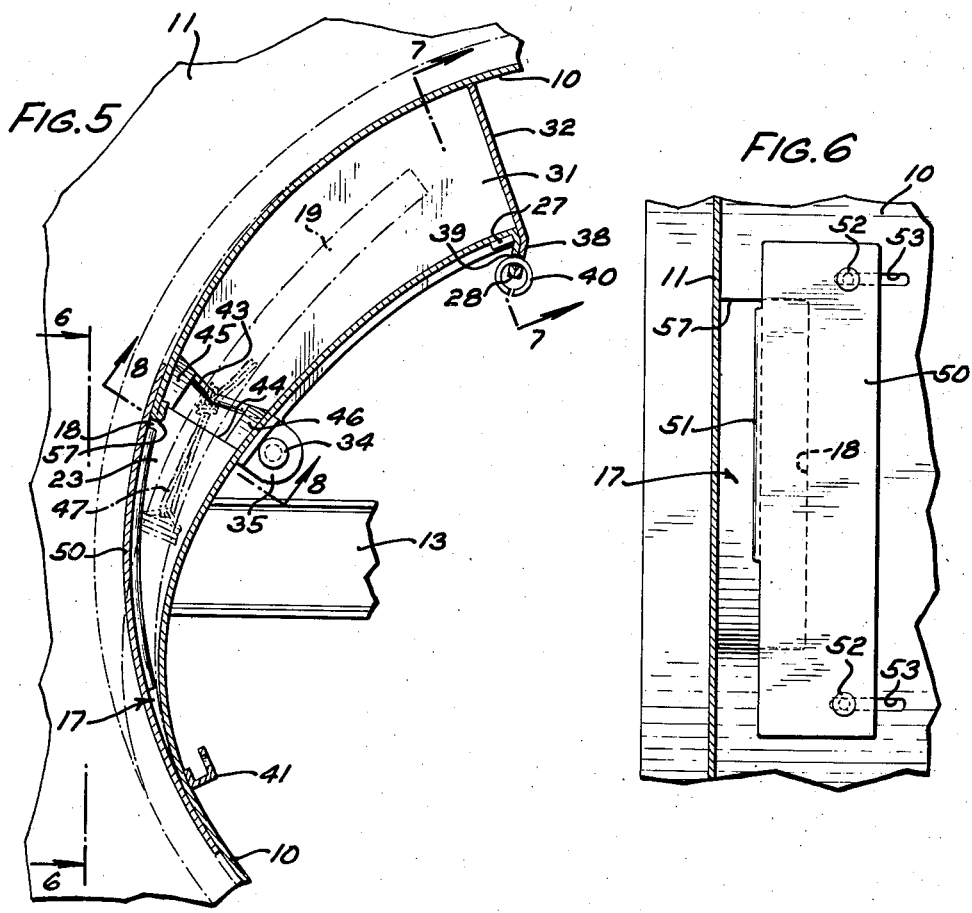
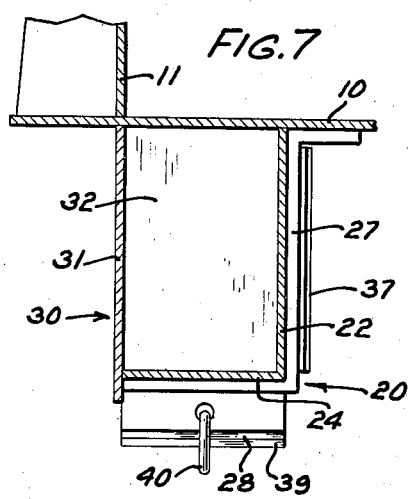
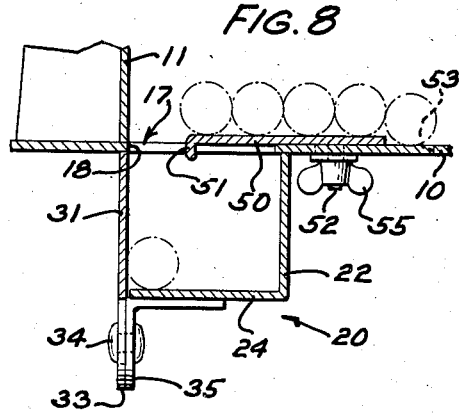
INVENTOR
A. A. BUREAU
BY
ATTORNEY Patented Feb. 8, 1949

2,460,972

UNITED STATES PATENT OFFICE 2,460,972

CABLE REEL WITH ADJUSTABLE DRUM PORT

Arthur A. Bureau, Chicago, Ill., assignor to Western Electric Company, Incorporated, New York, N. Y., a corporation of New York Application November 8, 1946, Serial No. 708,586

6 Claims. (Cl. 242—77)

This invention relates to reels and more particularly to a cable reel having a port in the drum thereof adjustable to the size of the cable wound on the reel for receiving one end of the cable therethrough.

A cable reel having a port in the drum thereof large enough to receive one end of a large size cable when used for supporting a cable of small size produces an undesirable bend in and, at times, damages the cable with the edge of the port where the cable is wound over the port opening adjacent to the end of the cable extending through the port.

It is an object of the present invention to provide a cable reel having a hollow drum with a port therein which is adjustable to the size of the cable wound on the reel.

In one embodiment of the invention, there is provided a reel having an open-ended hollow drum, to the ends of which are attached annular heads, the drum having a port adjacent a reel head to receive an end of a cable wound thereon and the drum is provided with a plate adjustably secured thereto to overlie various portions of the port to limit the size of the port according to the size of the cable wound on the drum.

The invention will be more fully understood from the following description taken in connection with the drawings, in which:

Fig. 1 is a side elevation of a reel with the invention applied thereto;

Fig. 2 is a vertical section of the reel taken on the line 2—2 of Fig. 1;

Fig. 3 is an enlarged elevational view of a portion of the reel showing the port and the adjustable cover member therefor in dotted lines and showing a receptacle for one end of the cable on the reel and a closure member therefor in an open position;

Fig. 4 is a fragmentary sectional view taken on the line 4—4 of Fig. 1;

Fig. 5 is a fragmentary transverse sectional view through the port and the receptacle taken on the line 5—5 of Fig. 2;

Fig. 6 is a fragmentary face view of a portion of the reel with parts in section and indicated by the line 6—6 of Fig. 5;

Fig. 7 is an enlarged fragmentary sectional view through the receptacle taken on the line 7—7 of Fig. 5; and Fig. 8 is an enlarged sectional view through the port and receptacle taken on the line 8—8 of Fig. 5.

The invention is shown as applied to a metal-type reel 9 comprising a drum 10 having open ends, to the outer peripheral surface of which are fixed annular heads 11 and 12 of any suitable construction. Cross members 13 and 14 are secured to the ends of the drum 10 and are provided with apertures 15—15, through which a rod may be inserted to rotatably support the reel 9.

Adjacent the head 12 of the reel 9, the drum 10 is provided with a port 17 in the form of a rectangular aperture 18, through which is inserted one end of a cable 19 that is to be wound on the reel. A casing 20 is secured to the inner periphery of the drum and forms a receptacle for receiving the end of the cable projecting through the port 17. The casing or receptacle 20 comprises spaced flat walls 22 and 23 positioned in substantial alignment with the side edges of the aperture 18 and a curved wall 24 formed integrally with the walls 22 and 23 and which is connected to the front edge of the aperture 18 and forms a continuation of the wall of the drum 10. The casing thus forms a curved receptacle of rectangular cross section secured to the inner periphery of the drum and extending from the port. The end 25 of the receptacle 20 is open. The curved wall 24 and the rear flat wall 22 (Fig. 3) are coextensive in length and terminate at 25, whereas the front wall 23 is shorter and terminates as indicated at 26 (Figs. 3, 4 and 5) to provide a side opening in the receptacle. The end of the cable 19 positioned within the receptacle is accessible through the side and end openings of the receptacle. A reinforcing strip 27 is secured to the end portion of the receptacle to reinforce the walls 22 and 24 and the end of the wall portion 24 is bent radially and angularly to form a flange 28, which is apertured at 29 (Figs. 3 and 5).

A movable cover or closure member 30 pivotally mounted on the casing 20 is provided to close the end and side openings of the casing 20. The closure member 30 comprises a flat side portion 31 shaped to conform to the curvature of a portion of the side of the receptacle and an end portion 32 disposed at right angles to the side portion 31 and adapted to close the end of the casing 20. An ear 33 is formed on the portion 31 and is connected by a pivot member 34 to a bracket 35 secured to the curved wall portion 24 of the casing 22 (Figs. 3, 5 and 8). The end wall 32 of the closure member is provided with flanges 37 and 38, the latter of which is apertured at 39 (Fig. 5) and is adapted to fit against the flange 28 when the closure member 30 is in its closed position. A ring 40 may be inserted through the aligned apertures in the flanges 28 and 38 to lock the cover in place. The closure member 30 may be rotated to its open position, indicated in Fig. 3, and locked in that position by inserting the ring 40 or other means through the aperture 39 in the flange 38 and an aligned aperture in a bracket 41 secured to the inner periphery of the drum 10.

In order to retain the end of the cable 19 in proper position within the receptacle and prevent relative displacement between the cable and the reel during the reeling operation, means are provided in the receptacle to which the end of the cable may be secured. This comprises an anchor member or bent rod 43 welded to the end portion of the side wall 23 and to the curved wall 24 of the casing 20 and to the drum 10. The end portion of the side wall 23 is slotted or notched at 44 to provide clearance for the intermediate portion of the rod 43. The wall portions 45 and 46 on opposite sides of the slot 44 are bent inwardly to position the rod 43 within the casing 20 so that the cover 30 may be closed without interference therewith. The end of the cable 19 enclosed in the receptacle may be secured to the rod 43 by any suitable means, such as a strand of material 47 tied to the cable 19 and to the rod 43.

The port 17 is made adjustable to accommodate cables of various sizes by providing a plate 50 (Figs. 6 and 8) in adjustable overlapping relation to the aperture 18. The plate 50 is provided with a curled edge 51 which, with the opposite edge of the aperture 18, determines the width of the port. A pair of studs 52—52, secured to the plate 50 and passing through slots 53—53 in the drum, are provided with washers 54—54 and thumb nuts 55—55 for securing the plate 50 in adjusted position. When used for small cable, the plate 50 is adjusted on the drum 10 (Fig. 8) to provide a port 17 of a width sufficient to receive the end of the cable 19 therethrough. Portions of some of the succeeding convolutions of the cable passing over the aperture 18 in the drum rest on the plate 50 and are thus supported on a surface having substantially the same curvature as the drum 10. Thus there is no possibility of the edge 57 of the port 17 and the aperture 18 to bend or otherwise damage cables of any diameter wound on the reel 10 when the plate 50 is adjusted to the size of the cable wound thereon.

What is claimed is:

1. A cable reel comprising a drum, reel heads on the drum, said drum having a port therein for receiving therethrough one end of the cable wound on said drum, and a member having a supporting surface conforming substantially to the curvature of the drum adjustably secured to said drum and movable to cover various portions of said port for restricting the width of said port to the size of the cable wound on the drum whereby said member supports the cable passing over the portion of the port covered by said member.

2. A reel for supporting cables thereon of various diameters comprising reel heads, a drum to which the reel heads are secured and which has an aperture therein, and means on said drum cooperating with a portion of said aperture to define a port through which an end of the cable wound on the drum may be passed, said means being adjustable on said drum to vary the size of said port according to the size of the cable on the drum.

3. A cable reel comprising a drum having an aperture therein for receiving an end of a cable wound on the drum, reel heads secured to the ends of said drum, a curved plate adjustable on said drum to overlie various portions of said aperture and thereby fix the effective width of said aperture, and means for securing said plate in adjusted position on said drum.

4. A cable reel comprising reel heads, a drum to which the reel heads are secured and which has a rectangular aperture in the periphery thereof adjacent a reel head and a pair of slots therein, a curved plate adjustably mounted on said drum to cover portions of the aperture to form a port of adjustable size, a pair of threaded members secured to said plate and passing through the slots in the drum, and locking members engaging said threaded members for locking said plates on the drum in adjusted position.

5. A cable reel comprising reel heads, a drum to which the reel heads are secured and which has a rectangular aperture formed in the periphery thereof with an edge of said aperture in alignment with a head on said drum, a plate curved to fit the drum overlying a portion of said aperture and having an edge thereon in parallel relation to said head, said plate being axially adjustable on the drum to space the edge of the plate at various distances from the head and in parallel relation thereto to form a port in the drum having an adjustable width, and means to secure the plate in adjusted position on said drum.

6. A reel for supporting cables thereon of various diameters comprising reel heads, a drum to which the reel heads are secured and which has an aperture forming a port therein for receiving one end of the cable wound on said drum, said aperture having a predetermined size to accommodate a cable of a predetermined maximum diameter a member shaped to the curvature of said drum for closing a portion of said aperture to form a port of reduced size in the drum and to form a support for the cables passing over the closed portion of said aperture when a cable of smaller diameter than said predetermined maximum is supported on said drum, and means for securing said member to said drum in a plurality of positions to vary the size of the port.

ARTHUR A. BUREAU.

REFERENCES CITED

The following references are of record in the file of this patent:

UNITED STATES PATENTS

| Number | Name | Date |
| --- | --- | --- |
| 1,849,977 | Decombe | Mar. 15, 1932 |
| 1,908,624 | Bureau | May 9, 1933 |
| 2,329,943 | Robins | Sept. 21, 1943 |
| 2,355,325 | Parker | Aug. 8, 1944 |